Figure 1:
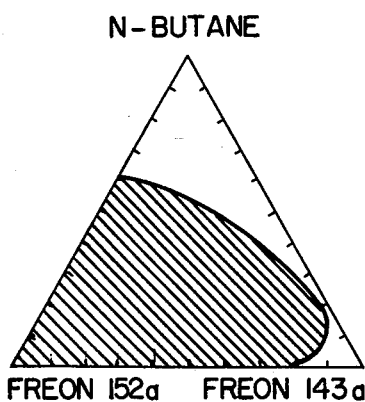
Figure 2:
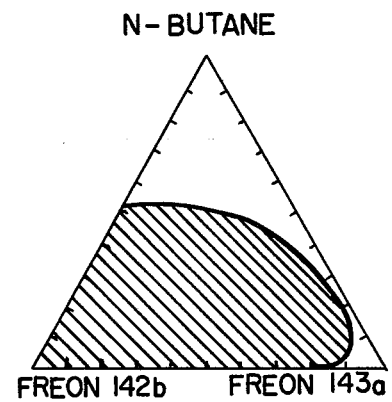
Figure 3:
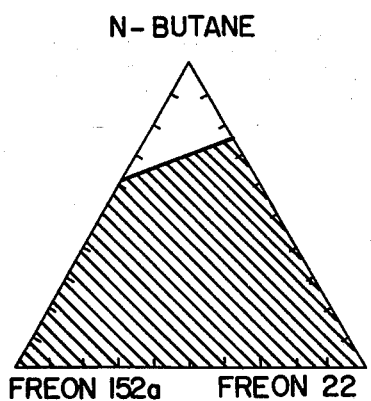
Figure 4:
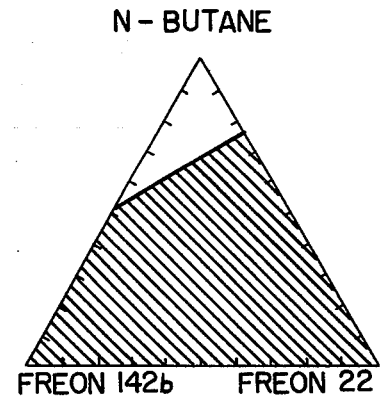

United States Patent [19]

Bargigia et al.

[11] 4,174,295

[45] Nov. 13, 1979

[54] AEROSOL PROPELLANT COMPOSITIONS

[75] Inventors: Gianangelo Bargigia; Gerardo Caporiccio; Giuliano Carniselli, all of Milan, Italy

[73] Assignee: Montedison S.p.A., Milan, Italy

[21] Appl. No.: 823,152

[22] Filed: Aug. 9, 1977

[30] Foreign Application Priority Data

Aug. 13, 1976 [IT] Italy .............................. 26269 A/76
Jun. 1, 1977 [IT] Italy .............................. 24249 A/77
Jun. 10, 1977 [IT] Italy .............................. 24579 A/77

[51] Int. Cl.² .......................... C09K 3/30; A61L 9/04; A61K 7/06; A61K 9/12
[52] U.S. Cl. ........................... 252/305; 252/90; 252/364; 424/45; 424/47; 424/DIG. 1
[58] Field of Search .................. 252/305; 424/45, 47

[56] References Cited

U.S. PATENT DOCUMENTS

| 2,908,650 | 10/1959 | Fine | 252/305 X |
| 3,073,794 | 1/1963 | Stoner | 252/305 X |
| 3,233,791 | 2/1966 | Miles | 252/305 X |
| 3,583,921 | 6/1971 | Healy et al. | 252/307 X |
| 3,655,865 | 4/1972 | Murphy | 424/45 |

Primary Examiner—Richard D. Lovering
Attorney, Agent, or Firm—Morgan, Finnegan, Pine, Foley & Lee

[57] ABSTRACT

The present invention concerns new propellant compositions for aerosols. More particularly, the present invention relates to propellant compositions for aerosols, characterized in that said compositions consist of a mixture of a chlorofluorocarbon or fluorocarbon (A) containing hydrogen and selected from the group consisting of $CHClF_2$, $CH_2F_2$ and $CF_3$—$CH_3$, with a chlorofluorocarbon or fluorocarbon (B) containing hydrogen and selected from the group consisting of: $CH_2ClF$, $CClF_2$—$CHClF$, $CF_3$—$CHClF$, $CHF_2$—$CClF_2$, $CHClF$—$CHF_2$, $CF_3$—$CH_2$—$Cl$, $CHF_2$—$CHF_2$, $CF_3$—$CH_2F$, $CClF_2$—$CH_3$ and $CHF_2$—$CH_3$. In addition to propellant A and propellant B, there may be included a hydrocarbon propellant so that a ternary propellant composition is provided.

5 Claims, 5 Drawing Figures

AEROSOL PROPELLANT COMPOSITIONS

BACKGROUND OF THE INVENTION

The substances mostly used as propellants for aerosols are: Freon 11 ($CCl_3F$) and Freon 12 ($CCl_2F_2$), which are commonly used in admixture with each other. There has been advanced the hypothesis that these substances, as a consequence of their accumulation in the atmosphere, may provoke the degradation of the stratospheric ozone.

Even though it could not be verified so far whether this hypothesis is well-founded or not, the above envisaged possible action is attributed to the decomposition of these substances under the impact of ultraviolet radiation, with the formation of chlorine radicals which, by a chain-reaction would degrade the $O_3$ to $O_2$.

On the contrary, it is considered that the hydrogen-containing fluorocarbons and chlorofluorocarbons cannot degrade stratospheric ozone. Such compounds may thus replace Freons 11 and 12 as aerosol propellants.

Even though numerous hydrogenated fluorocarbons and chlorofluorocarbons derived from methane and from ethane have boiling points quite suited for being used as propellants, they have not found application on a commercial scale as propellants because they do not possess the desired combination of chemical properties possessed by Freon 11 and 12, which enabled them to be used with success in a wide range of formulations for aerosols.

One of the basic chemical properties of aerosol propellants is their dissolving power, that is, their capacity to form a homogeneous liquid phase with the other components of the aerosol formulations, that is: the active ingredients, the solvents for said active ingredients, and the various auxiliary ingredients commonly used.

Only Freons 21 ($CHCl_2F$) and 11 have been considered good solvents, and this explains also why the most typical propellant composition consists of a component that is a good solvent (Freon 11) and of a component that raises the vapour tension (Freon 12).

Of interest is the publication by Paul A. Sanders ("Principles of Aerosol Technology," Van Nostrand Reinhold Company, New York, 1970, page 93), which reports the solvent power (expressed as the Kauributanol value) of some Freons, in a decreasing order of the solvent power:

| Freon 21 | $CHCl_2F$ | 102 |
|---|---|---|
| Freon 11 | $CCl_3F$ | 60 |
| Freon 113 | $CCl_2F—CClF_2$ | 31 |
| Freon 22 | $CHClF_2$ | 25 |
| Freon 142b | $CH_3—CClF_2$ | 20 |
| Freon 12 | $CCl_2F_2$ | 18 |
| Freon 114 | $CClF_2—CClF_2$ | 12 |
| Freon 152a | $CH_3—CHF_2$ | 11 |

The Freons with the greater solvent power are in general those which, at equal number of carbon and hydrogen atoms contain more chlorine atoms. On the other hand, those with the highest content in chlorine show a certain toxicity. This is one example of the difficulty to conciliate the various requisites that the aerosol propellants must satisfy.

In spite of its satisfying performances, the Freon 11 plus Freon 12 mixture, besides the problem of the possible degrading of the stratospheric $O_3$, brings with it a number of drawbacks. Freon 11 shows a certain toxicity. The mixture of the two Freons does not develop a satisfactory solvent power in certain applications, in particular, in those where the active ingredient consists of a resin as is the case of hair lacquers. In order to obtain a homogeneous lacquer formulation, it is necessary to use considerable quantities of the solvent of the resin, that is, usually anhydrous ethanol, with a corresponding burden of an increased cost, or revert to the addition of methylene chloride which is a good solvent of a low cost but which is relatively toxic. Moreover, Freons 11 and 12 have a relatively high molecular weight, wherefore, at equal weight, they deliver a smaller volume of gas in comparison to the propellants of lower molecular weight and thus have a lower yield in gas.

In certain aerosol formulations, there are also used saturated hydrocarbon propellants. The hydrocarbons most commonly used for this purpose are: propane, n-butane and iso-butane gases, possibly used in admixture with low-boiling liquid hydrocarbons, in particular, pentane and isopentanes.

These hydrocarbons have a low cost and a low molecular weight, but they have two serious drawbacks with regard to their use in aerosol compositions. The first drawback is their high inflammability, while the second is their low solvent power.

In consideration of these drawbacks, the hydrocarbon propellants are almost exclusively used in formulations containing an aqueous phase which contains the active ingredients in the state of an emulsion or suspension.

During the use of the spraying bottles, the presence of water in the aerosol jet reduces the risk due to the inflammability of the hydrocarbons.

OBJECTS OF THE INVENTION

One of the objects of this invention is that of providing new propellant compositions based on chlorofluorocarbons and/or fluorocarbons containing hydrogen, which shall display all the useful properties of the Freon 11 and 12 mixture, and even improve said useful properties.

Another object of the invention is that of providing new propellant compositions endowed with a high solvent power.

A further object of the invention is that of providing propellant compositions that shall contain, besides the fluorocarbon and/or chlorofluorocarbon containing hydrogen propellants also hydrocarbon propellants without showing the drawbacks of the hydrocarbon propellants.

Still another object is that of providing propellant compositions having a low molecular weight and, thus, developing a high yield in gas delivery.

GENERAL DESCRIPTION OF THE INVENTION

All these and still other objects are achieved by the aerosol propellant compositions of this invention, compositions which consist of a mixture of a hydrogen-containing chlorofluorocarbon or fluorocarbon (A), selected from the group consisting of $CHClF_2$ (Freon 22), $CH_2F_2$ (Freon 32) and $CF_3—CH_3$ (Freon 143a), with a hydrogen-containing fluorocarbon or chlorofluorocarbon (B) selected from the group consisting of: $CH_2ClF$ (Freon 31), $CClF_2—CHClF$ (Freon 123a), $CF_3—CHClF$ (Freon 124), $CHF_2—CClF_2$ (Freon 124a), $CHClF—CHF_2$ (Freon 133), $CF_3—CH_2Cl$ (Freon 133a), CHF$_2$—CHF$_2$ (Freon 134), CF$_3$—CH$_2$F (Freon 134a), CClF$_2$—CH$_3$ (Freon 142b) and CHF$_2$—CH$_3$ (Freon 152a).

The compositions object of this invention may contain a third component (C) consisting of a saturated hydrocarbon propellant. Suitable for this purpose are: n-butane, isobutane, pentane and isopentanes.

It has been found, according to this invention, that the above listed binary compositions (A)+(B) meet all necessary requisites for their use as aerosol propellants; they possess a suitable vapour tension; they are non-inflammable; have a high solvent power; are stable in respect of hydrolysis in an acid and neutral medium; and, are inert towards the other components of the formulations and with regard to the containers.

All these properties, besides other ones, and of which will be said more further on, are also found in the tenary compositions containing the third component (C), provided that the content of this (C) component is maintained within certain limits, as will be defined further on.

Moreover, it has been found, according to this invention, that the binary compositions (A)+(B) have a high solvent power which is far superior to that reported in the literature for the single components of groups A and B. Their solvent power, contrary to expectations, is definitely superior to that of the Freon 11 and 12 mixtures.

This high solvent power allows to prepare formulations that have a greater concentration in active ingredient. Also, it allows one to avoid making recourse to great quantities of costly solvents, such as for instance anhydrous ethanol, or to relatively toxic solvents such as methylene chloride. On the other hand, it allows one to use ternary mixtures containing a certain quantity of compound (C) which, used alone by itself, has no solving power.

The possibility to incorporate component (C), which used alone by itself is inflammable, depends also on the uninflammability of the binary mixture (A)+(B), uninflammability that is conferred on the ternary mixture, provided that the quantity of component (C) shall not exceed certain limits.

In the binary compositions the preferred A compounds are generally Freon 32 and 143a, while the preferred B compounds are generally Freon 124, 133a, 134a, 142b and 152a. Among the preferred binary compositions may be cited: Freon 143a+152a; Freon 143a+142b; Freon 143a+134a; Freon 32+142b; Freon 32+152a; Freon 32+134a and Freon 32+133a.

Excellent results are also obtained with the following binary compositions: Freon 22+31; Freon 22+123a; Freon 22+124a; Freon 22+133; Freon 22+133a; Freon 22+134; Freon 22+134a and Freon 22+152a.

In the ternary compositions the preferred A compounds are generally Freon 22 and 32; the preferred B compounds are generally Freon 124, 133a, 134a, 142b and 152a, while the preferred hydrocarbon propellants are n-butane and isobutane.

Among the preferred tertiary compositions may be cited: Freon 22+31+n-butane; Freon 22+123a+n-butane; Freon 22+124+n-butane; Freon 22+124a+n-butane; Freon 22+133+n-butane; Freon 22+133a+n-butane; Freon 22+133a+isobutane; Freon 22+134+n-butane; Freon 22+134a+n-butane; Freon 22+152a+n-butane; Freon 143a+152a+n-butane; Freon 143a+142b+n-butane; Freon 143a+134a+n-butane; Freon 143a+133a+n-butane; Freon 143a+124+n-butane; Freon 32+142b+n-butane; Freon 32+133a+isobutane; Freon 32+134a+n-butane and Freon 32+124+n-butane.

When the content in component (A) does not exceed 60%, the propellant compositions according to this invention in general have a pressure comprised between about 2 and about 6.5 atmospheres (relative atm) at room temperature (25° C.).

Compositions containing more than about 60% by weight of component (A), may be used but do not fall within the group of preferred ones because, considering their high pressures, they require the use of containers with construction characteristics differing from those commonly used at present and also require the use of different equipment for the introduction of the propellant mixture into the containers, in consequence of the high pressures produced by the mixture.

With regard to component (B), in general it is preferred to use not more than about 95% by weight of it; otherwise the pressure of the mixture would in certain cases become too low.

The limitations in the content of component (C) are above all strictly connected to the requisites of non-inflammability, which requisite is generally not met any more when the content of said component exceeds about 50% by weight. Even if they do not fall under the preferred ones, the compositions containing more than about 50% by weight of hydrocarbons may, however, be used within certain limits, in formulations that contain high quantities of non-inflammable substances wherefore the formulation turns out to be non-inflammable even if the propellant composition is inflammable.

This is the case, for instance, of formulations containing non-inflammable solvents such as methylene chloride. They may also be used in formulations containing an aqueous phase containing the active principles in the state of emulsion or suspension.

The binary compositions of this invention preferably have a content in component (A) comprised between 5% and 60% by weight, while the content in component (B) is preferably comprised between 40% and 95% by weight. The most preferred ones contain from 10% to 50% of component (A) and from 50% to 90% by weight of component (B).

The ternary compositions of this invention show preferably the following composition by weight:
   Component A: 5–60%
   Component B: 5–95%
   Component C: 0–50% (in general at least 1%).

The most preferred ones have the following composition:
   Component (A)=10–50%;
   comp. (B)=10–80%;
   comp. (C)=5–40%.

Components A and C and part of components B have a molecular weight that is considerably inferior to that of Freons 11 and 12; in consequence whereof it turns out that the binary and ternary propellant compositions of this invention have a weight for mol of composition very much lower than that of Freons 11 and 12; wherefore their delivery capacity at equal weight is much superior.

The density of the binary compositions, and above all, the density of the ternary compositions is definitely inferior to that of Freons 11 and 12. In many cases, it is very near the density of water, wherefore the corresponding compositions are also suited for use in emulsified formulations.

The compositions according to this invention are non-toxic or substantially non-toxic, while Freon 11 shows a moderate toxicity.

The inflammability of the compositions of this invention and that of the formulations that contain them has been tested according to the test of the Bureau of Explosives (B.O.E.) of the United States of America, as described on pages 136–140 of the treatise by Paul A. Sanders, cited previously.

According to that test, a compressed liquefied gas is defined inflammable when, ejected through the nozzle of a typical aerosol container placed at 6 inches from a source of a typical flame (plumber's candle), it will produce a flame that will project by more than 18 inches beyond the flame source, at fully open spray valve. If at any degree of pressing down the actuator (valve opening device) there is a back-firing towards the actuator, the liquefied compressed gas will be considered extremely inflammable.

The compositions according to this invention may be used on a wide range of applicational fields such as, among others, in the field of: hair lacquers, anti-perspiration products, for perfumes, deodorants for rooms, for paints, insecticides, for home cleaning products, for waxes, etc.

The formulations containing the binary and ternary propelling compositions of this invention may contain, in addition:

dispersing agents or solvents, such as water and various organic solvents: alcohols, glycols, chlorohydrocarbons, esters, ethers, aldehydes, and ketones, as, for instance: ethanol, ethyleneglycol, propyleneglycol, methylene chloride, ethyl ether, ethyl acetate, butyl acetate;

auxiliary dispersing agents: surfactants of the ionic and non-ionic type, such as: triethanolamino laurylsulphate, polyethyleneglycols, diethyleneglycol, monostearate, benzyldodecyldimethylammoniumsulphate; glycerides;

auxiliaries with a filling action such as e.g.: particular types of dispersed silica and talc;

auxiliaries modifying the rheological properties such as certain cellulose derivatives and certain synthetic polymer derivatives, for instance, carboxymethylcellulose and polyvinylacetate;

auxiliaries with a binding action such as for instance polyvinylpyrrolidone;

active ingredients with an antiseptic action, or with a deodorizing, perfuming, pharmacological, pesticide, antipathogenous action; etc. Said active ingredients may belong to different classes of substances such as: aldehydes, ketones, aliphatic and aromatic alcohols, esters of higher acids, glycerides, terpenic derivatives, polychlorobenzenes, quaternary ammonium salts, carbanylides, phenol derivatives and thio-derivatives.

The main advantages offered by the compositions object of this invention may be summarized as follows:

they may validly replace Freons 11 and 12 in all their applications, and often they offer even better performances;

they are endowed with a high solvent power, greater than that of Freons 11 and 12, wherefore it is possible to prepare formulations with a greater concentration of active principle and to limit the use of costly solvents such as anhydrous ethanol or of relatively toxic solvents such as methylene chloride;

they may contain, within certain quantitative limits, hydrocarbon propellants without thereby suffering any impairing of their properties;

as an average they have a low molecular weight, wherefore they give a high delivery efficiency;

their density is in many cases very near that of water, wherefore they are suitable for use in emulsified formulations.

SPECIFIC DESCRIPTION OF THE INVENTION

The following examples are given in order to better illustrate the invention. In the accompanying drawing, compositions of the present invention (FIGS. 1–4) are compared with a prior art composition (FIG. 5) for solvent power. Unless otherwise indicated, the ratios of the components of the propellant compositions and of the formulations for aerosols are indicated as ratios by weight.

EXAMPLE 1

This example refers to a propellant composition of Freon 22 and Freon 142b, and to its use in a hair lacquer. A solution 'D' was prepared which was suitable for a hair lacquer. This solution consisted of:

5.50 parts of resin 28/1310 (vinylacetate-carboxylate copolymer) produced by Eigenmann-Veronelli S.p.A.;
0.60 parts of aminomethyl propanol;
0.50 parts of perfume;
0.50 parts of benzyl alcohol;
46.45 parts of anhydrous ethanol;
46.45 parts of methylene chloride.

25 grams of solution 'D' were introduced into a Bettinelli type 120 ml container. This container is a Pyrex-glass, flanged test tube screened by a transparent plastic sheath.

On the mouth of the container a 1 inch spray valve was placed (1 inch=2.54 cm) and the air present in the container was evacuated by means of an oil vacuum pump.

Immediately thereafter, by means of a suitable metal ring, the valve was fixed onto the container and, by means of a dosing device, 46 grams of a propellant composition was introduced, consisting of 20 parts of Freon 22 and 80 parts of Freon 142b.

The solution thus obtained proved perfectly homogeneous, both at room temperature (about 25° C.) as at 0° C. The pressure of the formulated product equalled 2.6 relative atmospheres at 22° C.

In order to carry out the B.O.E. (Bureau of Explosives) test on the flame propagation previously described, a metal rule, provided with 1 inch (2.54 cm) indents (notches) was placed in a horizontal position. The bottle was then placed directly in correspondence with the first indent, orienting the spray nozzle in such a way that the jet may project along the rule.

In correspondence with the seventh indent, there is placed a plumber's gas burner which is so adjusted and fed as to deliver a 2 inches high flame that shall lap on the metal rule. Indent 25 of the rule corresponds to the 18 inch limit adopted for the B.O.E. flame propagation test.

This B.O.E. test was carried out 5 times, with a duration of 1-2 seconds per discharge. In no case there was any flame propagation and so much the less there was any backfiring, wherefore the formulation proved noninflammable. The formulation showed an altogether regular spray as appears from the examination of the angle of the jet and of the quantity of product vaporized, and from the projection test of the spray on a plane orthogonal to the jet.

EXAMPLE 2

This example concerns a composition of Freon 22 and Freon 142b and n-butane, and relates to the use of same in a hair lacquer.

Following the procedures described in example 1, 30 g of solution 'D' were introduced into a container identical with that of example 1, and subsequently there were introduced 55 g of a propellant mixture consisting of 15 parts of Freon 22, 45 parts of Freon 142b and 40 parts of n-butane.

The solution thus obtained proved perfectly homogeneous both at room temperature as well as at 0° C.

The pressure of the formulated product equalled 2.8 relative atmospheres at 22° C.

The B.O.E. test was carried out 5 times. In three cases there occurred a slight flame propagation; in the remaining two tests there was observed a more intense flame propagation that was, however, quite below the 18 inch limit. No backfirings were observed. The formulation resulted, thus, to be uninflammable.

At the spraying test, as explained in example 1, the formulation displayed an excellent behavior.

EXAMPLE 3

This example refers to a composition of Freon 22 and Freon 152a, as well as to its use in a hair lacquer.

Following the procedures described in example 1, 30 g of solution 'D' were introduced into a container and thereupon into it were added 55 g of propellant mixture consisting of 20 parts of Freon 22 and 80 parts of Freon 152a. The solution thus obtained proved perfectly homogeneous both at room temperature as well as at 0° C.

Under the B.O.E. test no flame propagation nor any backfiring could be observed.

At the spraying test, the formulation displayed an excellent behavior.

EXAMPLE 4

This example concerns a composition of Freon 22, Freon 152a and n-butane, as well as its use in a hair lacquer. Following the procedures described in example 1, 28 g of solution 'D' were introduced into a container, then into the same container there were introduced 52 g of a propellant mixture consisting of 14 parts of Freon 22, 56 parts of Freon 152a and 30 parts of n-butane. The solution thus obtained proved perfectly homogeneous both at room temperature as well as at 0° C. When the B.O.E. test was carried out, only just slight flame propagations falling amply within the 18 inch limit were observed, wherefore the formulation was rated noninflammable. At the spraying test, the formulation showed an excellent behavior.

EXAMPLE 5

This example concerns a composition of Freon 143a and Freon 142b, as well as its use in a hair lacquer. Following the procedures of example 1, into a container were introduced 30 g of solution 'D' to which were then added 55 g of a propellant mixture consisting of 20 parts of Freon 143a and 80 parts of Freon 142b. The solution thus obtained proved perfectly homogeneous both at room temperature as well as at 0° C.

On carrying out the B.O.E. test, no flame propagation nor any backfiring were observed. At the spraying test, the formulation proved to have an excellent behavior.

EXAMPLE 6

This example relates to a composition of Freon 143a and Freon 142b and n-butane, as well as to its use in a hair lacquer.

Following the same procedures as those of example 1, into a container were introduced 30 g of solution 'D' to which were then added 55 g of a propellant mixture consisting of 15 parts of Freon 143a, 45 parts of Freon 142b and 40 parts of n-butane. The solution thus obtained proved perfectly homogeneous both at room temperature as well as at 0° C. At the B.O.E. test, the formulation proved noninflammable. At the spraying test the formulation displayed an excellent behavior.

EXAMPLE 7

This example relates to a composition of Freon 143a and Freon 152a, as well as to its use in a hair lacquer. Following the procedures indicated in example 1, into a container were introduced 25 g of solution 'D' and to it were then added 46 g of a propellant mixture consisting of: 50 parts of Freon 143a and 50 parts of Freon 152a. The solution thus obtained proved perfectly homogeneous both at room temperature as well as at 0° C.

At the B.O.E. test, no flame propagation nor any backfiring were observed.

At the spraying test the formulation displayed an excellent behavior.

EXAMPLE 8

The example concerns a composition of Freon 143a and Freon 152a and n-butane, as well as its use in a hair lacquer.

Following the procedures indicated in example 1, into a container there were introduced 25 g of solution 'D' to which were then added 46 g of a propellant mixture consisting of: 40 parts of Freon 143a, 40 parts of Freon 152a and 20 parts of n-butane.

The solution thus obtained proved perfectly homogeneous both at room temperature as well as at 0° C. On carrying out the B.O.E. tests no flame propagation nor any backfiring was observed.

At the spraying test, the formulation displayed an excellent behavior.

EXAMPLE 9

This example relates to a propellant composition consisting of Freon 22, Freon 134a and n-butane, as well as to its use in a hair lacquer.

Into a 120 ml Bettinelli container there were introduced 35 g of solution 'D' to which was then admixed 65 g of a propellant composition consisting of 15 parts of Freon 22, 60 pts. of Freon 134a and 25 parts of n-butane.

The formulated product appeared to be homogeneous both at room temperature (abt. 22° C.) as well as at 0° C. Its pressure was equal to 4.8 relative atmospheres at 22° C. Under the B.O.E. test, the formulate proved to be noninflammable.

EXAMPLE 10

This example refers to a propellant composition consisting of Freon 22, Freon 133a and n-butane, as well as to its use in a hair lacquer.

Into a 120 ml Bettinelli container were introduced 24.6 g of solution 'D' to which were then admixed 45 g of a propellant mixture consisting of 25 parts of Freon 22, 50 parts of Freon 133a and 25 parts of n-butane. The formulate appeared homogeneous also at 0° C. and, under the B.O.E. test it proved to be noninflammable.

EXAMPLE 11

This example refers to a propellant composition consisting of Freon 143n, Freon 133a and n-butane, as well as to its use in a hair lacquer.

Into a 120 ml Bettinelli container there were introduced 25 g of solution 'D' to which were then admixed 46 g of a propellant mixture consisting of: 25 parts of Freon 143a, 50 parts of Freon 133a and 25 parts of n-butane.

The formulate appeared homogeneous also at 0° C., and under the B.O.E. test it proved to be noninflammable.

EXAMPLE 12

This example concerns a propellant composition consisting of Freon 22, Freon 31 and n-butane, as well as to its use in a hair lacquer.

Into a 120 ml Bettinelli container were introduced 25.5 g of solution 'D' to which were admixed 46.5 g of a propellant mixture consisting of: 30 parts of Freon 22, 35 parts of Freon 31 and 35 parts of n-butane.

The formulate appeared to be homogeneous even at 0° C. and under the B.O.E. test it proved noninflammable.

EXAMPLE 13

This example concerns a propellant composition of Freon 22, Freon 142b and n-butane, as well as to its use in an insecticide formulation.

To start with there was prepared a solution 'E' for insecticide consisting of:

6 parts of pyrethrum extract at 25% concentr.
13 parts of piperonyl butoxide
80,5 parts of an odourless petroleum fraction consisting of hydrocarbons with a boiling point comprised between 100° and 120° C.
0.5 parts of perfume.

Following the procedures indicated in example 1, into a container there were introduced 20 g of solution 'E' to which were then admixed 80 g of a propellant mixture consisting of: 19.5 parts of Freon 22, 45.5 parts of Freon 142b and 35 parts of n-butane. The solution thus obtained proved perfectly homogeneous both at room temperature as well as at 0° C. Under the B.O.E. test, there was observed only slight flame propagations that were decidedly below the 18 inch limit, while there was no backfiring. The composition was thus found uninflammable.

At the spraying test, the formulation displayed an excellent behavior.

EXAMPLE 14

This example refers to a propellant composition consisting of Freon 32, Freon 133a and n-butane, as well as to its use in a hair lacquer.

Into a 120 ml Bettinelli container there were introduced 32 g of solution 'D' to which were then added 62 g of a propellant composition consisting of: 15 parts of Freon 32, 70 parts of Freon 133a and 15 parts of n-butane.

The formulated product appeared perfectly homogeneous at room temperature (about 22° C.). Its relative pressure was 3.9 atm. at 22° C.

Under the B.O.E. flame propagation test the formulate proved noninflammable.

EXAMPLE 15

This example concerns a propellant composition consisting of: Freon 32, Freon 142b and n-butane, as well as to its use in a hair lacquer.

Into a 120 ml Bettinelli container were introduced 30 g of solution 'D' to which were then admixed 60 g of a propellant mixture consisting of: 12.5 parts of Freon 32, 75 parts of Freon 142b and 12.5 parts of n-butane.

The formulate appeared perfectly homogeneous at room temperature (about 22° C.), and, when subjected to the B.O.E. test, it proved to be noninflammable, while its pressure equalled 4.3 relative atmospheres at 22° C.

EXAMPLE 16

In this test was ascertained the chemical inertia of the formulations of examples 1 and 13, with reference to metal containers, by means of accelerated corrosion tests whereby the formulations prepared in the metal containers according to the procedures followed in the corresponding examples, except for the formulation volume and the nature of the container, were left to rest in the container at 50° C. for 90 days.

The formulation of example 1 was tested in a 400 ml aluminum container in which there were 45 g of solution 'D' and 83 g of propellant mixture.

The formulation of example 13 was tested in a 400 ml tin plate container in which there had been introduced 40 g of solution 'E' and 160 g of propellant mixture. At the end of the test, the containers were cooled down to $-80°$ C. and then cut open with a pair of shears. The content was then poured into a glass beaker and left to spontaneously warm up to room temperature.

The clear, colorless liquid that had formed contained $14 \cdot 10^{-6}$ g of aluminum in the first case, while at the flame spectrophotometer no traces of iron nor of tin were detected in the second case. Both containers proved free of any signs of corrosion.

EXAMPLE 17

This example illustrates the high solvent power of the ternary compositions object of this invention.

For this purpose, there were prepared various different formulations, each containing 35% of solution 'D' and 65% of propellant composition.

There were used 4 types of propellant compositions:
Freon 143a + Freon 152a + n-butane;
Freon 143a + Freon 142b + n-butane;
Freon 22 + Freon 152a + n-butane;
Freon 22 + Freon 142b + n-butane.

For each type of propellant composition, the proportion of the 3 components was varied, and it was checked whether each specific composition was miscible or immiscible with solution D. This determination was carried out at room temperature (abt. 25° C.). The composition was considered miscible when it formed a perfectly homogeneous solution with the resin.

It was considered immiscible when there were observed cloudiness phenomena.

These results were recorded on the ternary diagrams present in the attached FIGS. 1–5. The tests were carried on until their results permitted to trace (plot) the delimitation curve between the miscibility zone (dashed or hatched portion of the diagrams of the attached FIGS. 1–5 and the immiscibility zone.

For comparative purposes, the tests were also carried out by means of the ternary system Freon 11+Freon 12+n-butane; the results have likewise been recorded in the bottom ternary diagram (FIG. 5) of the attached sheet.

Figure 5:
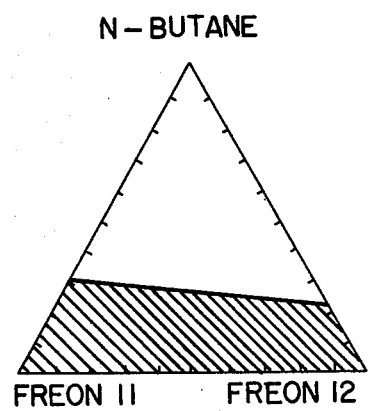

On comparing the 5 diagrams it will be noted that the miscibility zone is much more extended in the case of the compositions according to the invention (FIGS. 1-4) in comparison to those based on Freon 11 and Freon 12 (FIG. 5).

What we claim is:

1. A propellant composition for use with aerosols, the composition consisting essentially of a mixture of:
   (A) from 5 to 60% by weight, based on the total weight of the propellant composition, of a hydrogen-containing fluorocarbon selected from the group consisting of $CH_2F_2$ and $CF_3$—$CH_3$, and
   (B) from 40 to 95% by weight, based on the total weight of the propellant composition, of a hydrogen-containing chlorofluorocarbon or a hydrogen-containing fluorocarbon, each being selected from the group consisting of $CF_3$—CHClF, $CF_3$—$CH_2Cl$, $CF_3$—$CH_2F$, $CClF_2$—$CH_3$ and $CHF_2$—$CH_3$.

2. A propellant composition as defined in claim 1 wherein fluorocarbon (A) is $CH_2F_2$.

3. A propellant composition as defined in claim 1 wherein fluorocarbon (A) is present in an amount of from 10 to 50% by weight, and chlorofluorocarbon or fluorocarbon (B) is present in an amount of from 50 to 90% by weight, based on the total weight of the propellant composition.

4. A propellant composition for use with aerosols, the composition consisting essentially of, in admixture:
   (A) from 5 to 60% by weight, based on the total weight of the propellant composition, of the hydrogen-containing fluorocarbon $CH_2F_2$;
   (B) from 5 to 95% by weight, based on the total weight of the propellant composition, of a hydrogen-containing chlorofluorocarbon or a hydrogen-containing fluorocarbon, each being selected from the group consisting of $CF_3$—CHClF, $CF_3$—$CH_2Cl$, $CF_3$—$CH_2F$, $CClF_2$—$CH_3$ and $CHF_2$—$CH_3$; and
   (C) up to 50% of a hydrocarbon selected from the group consisting of n-butane and iso-butane.

5. A propellant composition as defined in claim 4, wherein fluorocarbon (A) is present in an amount of from 10 to 50% by weight, chlorofluorocarbon or fluorocarbon (B) is present in an amount of from 10 to 80% by weight, and hydrocarbon (C) is present in an amount of from 5 to 40% by weight.

* * * * *